Aug. 21, 1934.　　　　W. LENZE　　　　1,970,859
STABILIZER
Filed Aug. 4, 1933
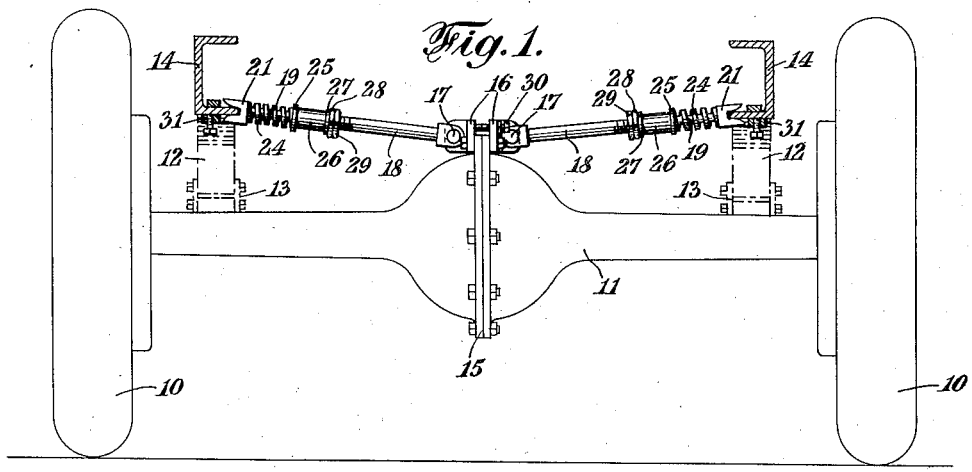
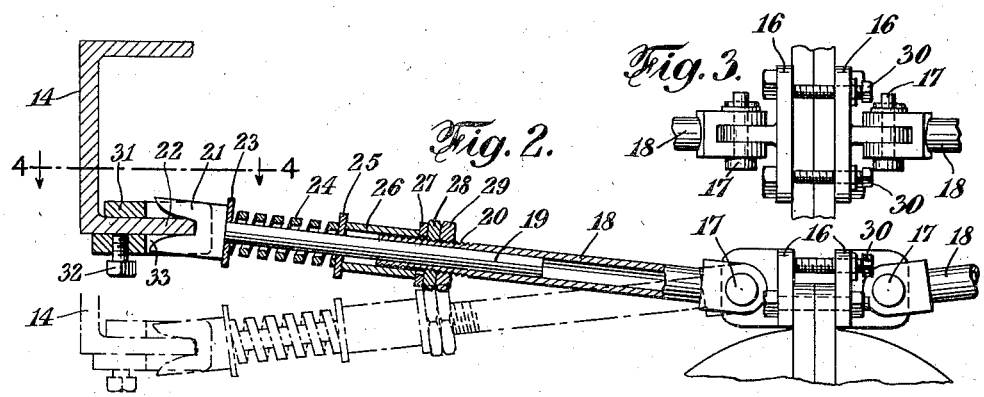
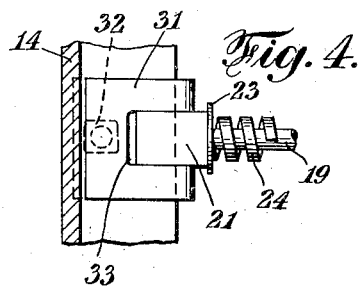
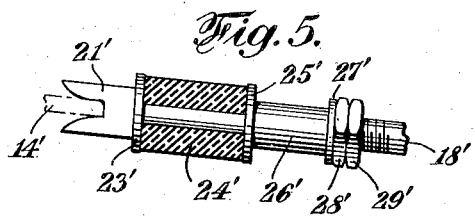
INVENTOR
Walter Lenze.
BY
his ATTORNEY Patented Aug. 21, 1934

1,970,859

UNITED STATES PATENT OFFICE 1,970,859

STABILIZER

Walter Lenze, New York, N. Y.

Application August 4, 1933, Serial No. 683,580

3 Claims. (Cl. 280—104)

The present invention relates to frame adjusting or stabilizing means for vehicles.

Its prime objects are to provide a very simple, easily mountable and relatively inexpensive device for preventing or minimizing to a large extent, the twisting of spring and shackle-suspended vehicle frames, when the vehicles are unevenly loaded and/or when traveling upon a beveled road.

It is well known in the automotive industry that the resilient suspension of the chassis frame above the axles of a vehicle may never be made rigid enough to prevent twisting of the vehicle body and the frame, without defeating its original purpose, that of effectively absorbing the continuous up and down movements of the wheels traveling over uneven pavements. Consequently it is generally admitted that when a vehicle, particularly a truck, is caused to frequently travel over the inclined side of a beveled road, the frame will gradually flex in the direction of the incline and eventually will remain deflected.

Such deflection becomes accentuated by injudicious loadings of the vehicle, as for instance by allowing the heavier articles of the load to be placed on that side of the body which usually travels over the incline of the road, or by permitting the load to shift, which shifting is particularly noticeable when the vehicle takes a curve. The resulting deflection of the frame relative to the wheels and understructure is bound to cause serious damage to the vehicle and to the tires, since the entire assembly is brought out of alignment.

The present invention is intended to effectively prevent permanent damage to the frame and other parts of vehicles due to the twisting of the frame, by interposing at substantially right angles to the direction of travel of the vehicle and between the frame members and a fixed point central between them, the latter point preferably located at the housing of the rear transmission, a pair of symmetrically disposed, resiliently and pivotally mounted, adjustable members, which are designed to absorb the strain which the frame members are ordinarily subjected to, in the aforementioned manner.

The foregoing objects and still other features of my invention will become more fully apparent from the following description and the accompanying drawing, the latter forming part of my disclosure but is not intended to limit me to the actual showing.

In the drawing:

Figure 1 represents the rear-transmission and the rear wheels of a truck, equipped with my stabilizer.

Figure 2 is an enlarged illustration of a stabilizer, engaging the frame of a vehicle, shown in two positions.

Figure 3 is the top view of the stabilizer attaching brackets.

Figure 4 is a detail view of the frame engaging end of my stabilizer and of means for preventing it from moving sidewise, and Figure 5 is a modified form of my stabilizer.

Referring now to Figure 1, numeral 10 denotes the wheels and numeral 11 the housing of the rear transmission of a vehicle from which transmission are suspended by means of springs 12 and shackles 13, frame members 14, preferably in the shape of channels. Secured to the central flange 15 of the transmission housing, there will be observed attaching brackets 16 to which are pivotally connected at 17 tubular members 18 of my stabilizer, which latter are disposed substantially at right angles to the direction of travel of the vehicle.

The construction of the stabilizer will be more readily understood from Fig. 2. It comprises besides tubular member 18, a cylindrical operating member 19, in telescoping engagement with member 18. The latter member is externally threaded as indicated at 20. Operating member 19 is equipped with a frame engaging end 21 which is shaped in the form of a fork, which latter is adapted to straddle flange 22 of frame member 14. Against end 21 is seated a washer 23, against which bears a coil spring 24, the other end of which abuts with another washer 25, against which operates a sleeve 26 mounted over the threaded portion of member 18. Against sleeve 26 rests a third washer 27 and against this washer bears nut 28, and against this nut a lock-nut 29 is adapted to abut. By means of sleeve 26 and the nuts in engagement with the threaded portion 20 of member 18, spring 24 may be readily adjusted, whereby the operation of member 19 within member 18 is controlled.

Referring to Fig. 3, attaching brackets 16 are shown fixedly mounted upon flanges 15 of the housing and are rendered adjustable relative to one another by means of set screws 30, which set screws are intended to transmit whatever excess pressure is brought to bear against one side of the frame towards the other frame.

From Fig. 1 it will be clearly observable that the connection of members 18 is substantially centrally located between frame members 14 and that their suspension point is independent of these frame members.

It is to be noted that frame engaging ends 21 and pivotal points 17 of the stabilizers are disposed in a plane which is at substantially right angles to the direction of travel of the vehicle and consequently also at substantially right angles to the frame members 14, which latter are parallel to the direction of travel.

Although I have shown the attachment of tubular members 18 to the transmission housing, it does not follow that brackets 16 need to be secured at that point of the chassis, but may be attached at any suitable place along the vertical center plane dividing the chassis into symmetrical halves. Of course it is essential that the point of central suspension must be relatively fixed as otherwise the purpose of my device would be defeated.

Reverting to Fig. 2, it will be seen that the full line position of my stabilizer indicates that frame member 14 is engaged by the stabilizer at its uppermost position, which corresponds to the position taken by the frames when the vehicle is not loaded. The broken line position indicates my device in engagement with frame member 14 when the latter is depressed due to the load in the vehicle.

In Fig. 4 there is illustrated a limiting device indicated at 31 which consists of a yoke embracing the lower flange of member 14 and attached thereto by means of a set-screw 32. The central portion of yoke 31 is recessed as shown at 33, which recess is adapted to register with and to prevent a sidewise movement of the frame engaging end 21 of my device.

The modified construction shown in Fig. 5 employs instead of spring 24, a rubber cushion 24' which may be compressed between washers 23' and 25' by the operation of sleeve 26', washer 27' and nuts 28' and 29'.

*Operation*

Any existing vehicle may be successfully equipped with my stabilizer in that brackets 16 or other central attaching means are secured to any part of the vehicle from which my stabilizers extend symmetrically towards the frame members of the chassis. When the vehicle travels over an even road the stabilizers will assume their normal position as shown in Fig. 1. When the vehicle is loaded, frame members 14 will become depressed as shown in Fig. 2 in broken line. If the load, however, is not evenly distributed, one of the frame members will sag more against the axle than the other, whereby the position of the stabilizer engaging the sagging frame member will be deflected somewhat in a downward direction. The pivotal suspension of members 18 of my stabilizers are designed for just such angular movement which is facilitated by the construction of the frame engaging end 21 of the operating member of my device.

Assuming now that the vehicle enters a road which is beveled to one side and that the right hand wheels are disposed lower than the left hand wheels; this will cause the load in the vehicle to bear with its weight against the right hand side, thereby having the tendency of deflecting frame members 14 to the right. The left hand stabilizer will then function in that spring 24 will exert a pressure against the left hand frame member, which ordinarily is fixedly connected with the right hand frame member, whereby the frame is prevented from shifting to the right.

When the vehicle travels around a curve, forcing the weight of the load to one side or the other, the stabilizers will prevent a deflection in the same manner as described above.

While I have described and shown certain specific arrangements of my invention, it is quite obvious that changes and improvements may be incorporated therein in order to adapt my device to serve in connection with any kind of vehicles, and I therefore reserve for myself the right to make such changes and improvements as may become necessary during the course of manufacturing my device, without departing from the broad scope of my invention as stated in the annexed claims.

I claim:

1. The combination with the frame and transmission of a vehicle, of a stabilizer, comprising an adjustable transmission attaching bracket, a tubular member having means for pivotally engaging said bracket, another member in telescoping engagement with said tubular member and provided with frame engaging means, a resilient element interposed between said other and said tubular member, and adjusting means for said element operatively mounted with said tubular member.

2. The combination with the frame and transmission of a vehicle, of a stabilizer, comprising an adjustable transmission attaching bracket, a tubular member having means for pivotally engaging said bracket, another member in telescoping engagement with said tubular member and provided with frame engaging means, a resilient element interposed between said other and said tubular member, adjusting means for said element operatively mounted with said tubular member and means adapted to be associated with the vehicle frame for preventing the disengagement between said frame engaging means and the vehicle frame.

3. In stabilizers for vehicles, a pair of adjustable brackets adapted to be symmetrically and fixedly mounted to the housing of a vehicle transmission, a pair of tubular members pivotally secured to and extending from said brackets, a pair of frame-directed members telescoping within said tubular members, and provided with frame-engaging means, a sleeve mounted over each of said tubular members, a coil spring interposed between said sleeve and said frame-engaging means, and spring adjusting elements bearing against said sleeve.

WALTER LENZE.